Jan. 11, 1949. W. J. MARENCIK ET AL 2,458,715
METHOD OF PREVENTING SCALING
Filed Aug. 25, 1944
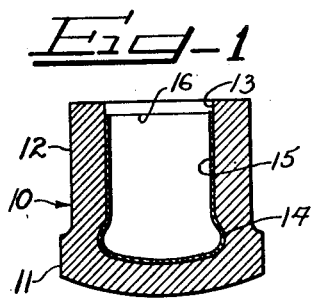
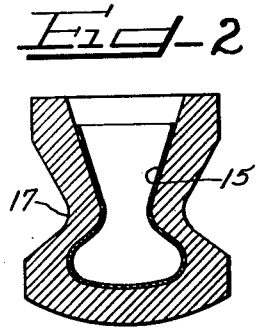
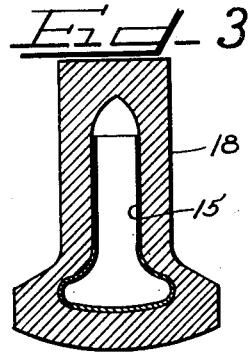
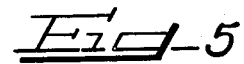
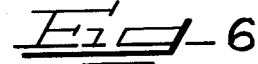
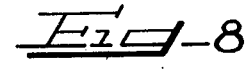
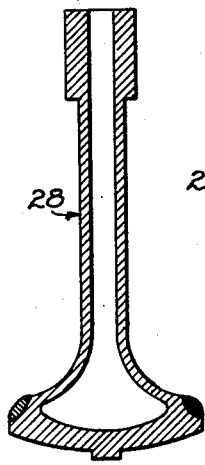
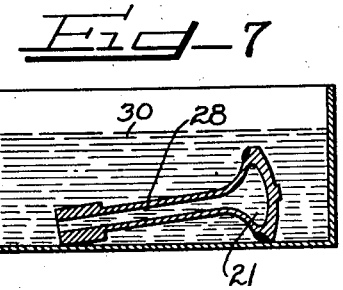
INVENTORS
William J. Marencik
Robert E. Ahlf
by Charles Hills ATTYS Patented Jan. 11, 1949

2,458,715

UNITED STATES PATENT OFFICE 2,458,715

METHOD OF PREVENTING SCALING

William J. Marencik and Robert E. Ahlf, Cleveland, Ohio, assignors to Thompson Products, Inc., Cleveland, Ohio, a corporation of Ohio Application August 25, 1944, Serial No. 551,194

1 Claim. (Cl. 78—81)

This invention relates to a method of preventing scaling and more particularly to a method for preventing the scaling of metal articles, such as hollow valves, during the forging and other heat treating operations to which such articles are subjected in the course of their manufacture.

It has previously been proposed, as in the Caugherty Patents Nos. 2,337,186 and 2,338,165, to apply molten glass to wire or the like to remove scale and oxides from the wire. According to these patents, upon the cooling of the glass coated wire, aided, if necessary, by flexing the wire, the glass coating flakes off and carries with it the scale or oxides that may be on the wire. The Caugherty Patent No. 2,337,186 also suggests that this method may be used "for preventing scale and oxides from forming during heat treatment."

We have found, however, that it is not feasible to attempt to protect a metal surface against the formation of scale and oxides by the application thereto of molten glass, prior to the heat treatment operation, since if the molten glass is to be caused to adhere to the metal article, the article itself must be heated to a temperature at which scale and oxides would form on the surfaces thereof. Neither is it practical in many instances to attempt to remove the glass coating by simply cooling or cooling and flexing the same. Even where a most careful selection of glass is made with respect to its coefficient of expansion, it is practically impossible to remove all of the glass coating from rigid metal articles by a simple cooling step, and it is usually not practical to subject a metal article to a sufficiently drastic thermal shock, or to impact shocks, to effect a complete flaking off of the glass.

We have now found in accordance with our present invention that the surface of a metal article may be more satisfactorily protected from scaling and oxidation by the application thereto, while in a cold state, of a material, such as frit, capable upon fusion of forming a protective coating over the metal surface. In the case of frit, liquid dispersion of the frit, such as an aqueous dispersion or a dispersion in a volatile organic solvent, is applied to the cold surface of the metal article to be protected and then preliminarily dried at relatively low temperatures to form a dry coating thereover. When the metal article is subjected to the desired forging or other heat treatment steps, the frit is caused to fuse at the elevated temperatures and to form a protective glassy coating over the surface of the metal article.

We have also found that the removal of the glassy coating, subsequent to the heating operations necessary to the manufacture of the metal article, can be best effected by subjecting the coating to the action of hot caustic. The molten caustic dissolves or otherwise decomposes the glass coating and leaves the surface of the metal clean and free from scale or oxides.

It is therefore an important object of this invention to provide an improved method of preventing the scaling of metal articles which during their manufacture are normally subjected to relatively high temperatures, such as in forging operations and the like.

It is a further important object of this invention to provide a method of preventing scaling of metal articles, in accordance with which the surfaces to be protected, while cold, are coated with a material capable upon fusion of forming a protective coating that adheres to the metal surfaces during the heating operations to which the article may be subjected during the course of its manufacture.

It is a further important object of this invention to provide a method of preventing scaring by coating the surface to be protected with a glass having a fusion temperature below that to which the article is to be heated in the course of its manufacture, and then subjecting the glass coating to the action of molten caustic to remove the coating.

It is a further important object of this invention to provide an improved method for preventing scaling on the internal surfaces of hollow poppet valves during the course of their manufacture, the method including the application to the internal surfaces of the hollow blank, while cold, of an aqueous dispersion of frit, preliminarily heating the blank to dry the frit, subjecting the blank to the various forging operations to form a hollow valve therefrom, drilling or piercing the stem end of the valve, and subjecting the valve to molten caustic bath to dissolve out the glass coating formed from the frit by fusion during the forging operation.

Other and further important objects of this invention will be apparent from the disclosures in the specification and the accompanying drawings.

Figure 1 is a longitudinal sectional view of a cup-shaped blank for use in the manufacture of a hollow valve, the internal surface of which has been provided with a glassy coating in accordance with the principles of our invention.

Figure 2 is a longitudinal sectional view of the valve blank after being subjected to a forging operation to reduce the neck thereof.

Figure 3 is a longitudinal sectional view of a valve blank after an extrusion operation.

Figure 4 is a longitudinal sectional view of a further stage in the manufacturing operations, after a second forging operation to reduce the neck of the valve blank.

Figure 5 is a broken longitudinal sectional view of the valve after the completion of the stem forming extrusion step and the upsetting of the stem.

Figure 6 is a longitudinal sectional view of the valve after the stem has been drilled or pierced.

Figure 7 is a longitudinal sectional view of the valve in a molten caustic bath for the purpose of removing the glassy coating from the internal surface of the valve.

Figure 8 is a longitudinal sectional view of the valve with the coating removed.

While this invention is illustrated and will be described in connection with its application to the manufacture of a hollow head valve for aircraft, it will be understood that the method is generally applicable to the prevention of scaling on surfaces of metal articles which, during the course of their manufacture, are subjected to elevated temperatures that would normally cause the formation of scale and oxides on the surface thereof.

The reference numeral 10 indicates a cup-shaped blank such as is used in the start of operations for the manufacture of a hollow head aircraft valve. Said blank 10 comprises a head portion 11 and a reduced cylindrical shank portion 12 defining an internal cavity 13 that is slightly enlarged, as at 14, in the head portion 11. The blank 10 is formed of a metal or alloy having the desired characteristics for use in aircraft valves.

When a blank such as the blank 10 is subjected to the forging and extrusion operations necessary to produce the final hollow head valve, a considerable amount of scaling occurs, due to the high temperatures to which the blank must be heated in these forging and extrusion operations. The scale so formed is difficult to remove, but, if not removed entirely, greatly decreases the rate of heat transfer to the coolant that partially fills the hollow head valve in its final form and that is relied upon for maintaining the valve at proper operating temperatures during use in an internal combustion engine.

In accordance with the principles of our present invention, the blank 10, while at normal room temperatures and while in a clean state, free from grease, scale and oxides, and preferably lightly etched, is provided with a protective coating over the surface of the cavity 14. To accomplish this, an aqueous suspension of frit is applied to the surface of the cavity 14, as by dipping or spraying, to form a layer 15 over such surface. The aqueous frit suspension may, for instance, be poured into the cavity 14 while the blank is in the position illustrated in Figure 1, and the blank is then turned upside down to remove the excess of the aqueous suspension and leave a thin coating or layer 15 over the surface of the cavity 14. Alternatively, the internal surface of the blank 10 may be sprayed with the aqueous frit suspension to give a film of the desired thickness. The coating 15 need not extend to the end of the cylindrical cavity 13, but may terminate short thereof, as at 16, since this uncoated portion of the cavity will subsequently be closed together and then drilled out.

After the blank 10 has been coated with the film 15 of frit suspension, it is subjected to a preliminary heating step, as by heating to about 200° F., to dry the frit coating and form a dry, relatively hard and adherent layer. The blank is next subjected to a forging operation in which the blank is heated up to the necessary forging temperature and is subjected to the action of hammers to constrict the neck of the blank, as at 17 (Figure 2). At the elevated temperatures of the forging operation, which are usually in the neighborhood of from 1,800° to 2,100° F., the coating 15 fuses to form a coherent and adherent protective layer over the internal surfaces of the blank.

In the next step, the blank is subjected to an extrusion or swaging operation, to form an elongated stem portion 18. During both of these forging operations the protective coating 15 remains adherent to the internal surface of the blank, and because of its fused condition, flows sufficiently to completely cover the portion of the surface originally protected thereby. The formation of scale and oxides during these forging operations is thus prevented.

In the next operation, illustrated in Figure 4, the blank is again subjected to the action of forging hammers to produce a more restricted neck portion 19. In the course of this forging operation, the stem portion of the blank is completely closed to form a solid stem 20 and a completely enclosed cavity 21, the walls of which are protected by the coating 15.

In the next step (Figure 5) the valve blank is again subjected to an extrusion or swaging step, and also to an upsetting step, thereby producing an elongated stem portion 22 having an enlarged end portion 23. The wall of the cavity 21 remains protected by the coating 15.

The stem portion 22 is drilled or pierced in the next operation to provide a valve having a hollow stem portion 24 (Figure 6) in communication with the head cavity 21. At this point, highly corrosion-resistant material such as "Brightray," may be welded, as by "puddling," about the head portion 25 to form an annulus 26, which is later machined to constitute the valve seat in the finished valve. The head 25 is also provided with a coaxially extending lug 27 that is used for centering the valve in the subsequent machining steps.

The partially finished valve, indicated generally by the reference numeral 28 (Figures 6 to 8) is next immersed in a bath 29 of molten caustic 30 for the purpose of removing the glass coating 15. The caustic bath may be maintained at a temperature of about 1,000° F. The action of the molten caustic is to dissolve away or decompose the glass coating 15 and leave the internal surface of the cavity 21 clean and entirely free of any scale or oxides. The treatment in the molten caustic requires only a few minutes and is complete in a matter of, say, ten minutes. After removal from the molten caustic bath, the valve is immediately quenched in water. The quenching step serves to remove free caustic and any dissolved glass from the surfaces of the valve, to leave the valve in the form illustrated in Figure 8 with clean, oxide-free surfaces. The valve is then subjected to whatever further machining steps are necessary, but since it is not again subjected to elevated temperatures, there is no subsequent tendency for scale or oxides to form on the surfaces of the valve.

The term "frit" is herein used to cover finely divided, semi-fused materials such as are used in making glass and vitreous enamels. These materials form vitreous, or glassy, coatings when fused on metal.

As a result of the use of our method of preventing scale formation in the manufacture of hollow head aircraft valves, a considerable saving in time and expense can be realized as compared with the previous method of manually removing the scale from the hollow head of the valve by the use of abrasive cloth. Our method insures that the internal surfaces of the head cavities of the valves are clean and free from scale or oxides, so that these surfaces will have a high rate of heat transfer when the valves are filled with a coolant, such as sodium.

It will, of course, be understood that various details of construction may be varied through a wide range without departing from the principles of this invention and it is, therefore, not the purpose to limit the patent granted hereon otherwise than necessitated by the scope of the appended claim.

We claim as our invention:

The method of preventing scaling of a hollow metal blank during a hot forging operation, which comprises applying to the internal surface of said blank, while substantially clean and at a temperature below that at which scale would form, an aqueous suspension of a finely divided semi-fused frit capable of forming a glassy coating on fusion that is adherent to the metal surface, preliminarily heating said blank to around 200° F. to dry said frit and form a relatively hard adherent layer, subjecting the exterior of said blank to a forging operation at a temperature sufficiently high to cause said frit to fuse and form a protective coating over such internal surface and thus prevent the formation of scale and oxides during said forging operation and maintaining said coating over such internal surface until the completion of said forging operation.

WILLIAM J. MARENCIK.
ROBERT E. AHLF.

REFERENCES CITED

The following references are of record in the file of this patent:

UNITED STATES PATENTS

| Number | Name | Date |
| --- | --- | --- |
| 528,156 | Gaetz | Oct. 30, 1894 |
| 1,085,768 | Thompson | Feb. 3, 1914 |
| 1,190,937 | Moore | July 11, 1916 |
| 1,433,213 | Lowell | Oct. 24, 1922 |
| 1,898,809 | Berg | Feb. 21, 1923 |
| 2,321,917 | Jenkins et al. | June 15, 1943 |

FOREIGN PATENTS

| Number | Country | Date |
| --- | --- | --- |
| 300,633 | Great Britain | Nov. 28, 1929 |